UNITED STATES PATENT OFFICE.

WALTER S. LANDIS, OF NIAGARA FALLS, NEW YORK, ASSIGNOR TO FRANK S. WASHBURN, OF NASHVILLE, TENNESSEE.

PROCESS OF RENDERING AVAILABLE PHOSPHORIC ACID.

1,137,065.

Specification of Letters Patent.

Patented Apr. 27, 1915.

No Drawing.

Application filed March 3, 1915. Serial No. 11,849.

*To all whom it may concern:*

Be it known that I, WALTER S. LANDIS, a citizen of the United States, residing at Niagara Falls, in the county of Niagara and State of New York, have invented certain new and useful Improvements in Processes of Rendering Available Phosphoric Acid; and I do hereby declare the following to be a full, clear, and exact description of the invention, such as will enable others skilled in the art to which it appertains to make and use the same.

This invention relates to a process of rendering available for fertilizer purposes the phosphoric acid contained in phosphate rock, and has for its object to provide a method which will be less expensive and more expeditious than those heretofore proposed.

With these and other objects in view the invention consists in the novel steps and combinations of steps more fully hereinafter disclosed and particularly pointed out in the claims.

In order that the differences between this process and those that have gone before may be clearly understood it is said: It is a well known fact that when phosphate rock is heated to a high temperature in the presence of a base such as soda, or potash, with or without the admixture of lime, a combination of the base and the tri-calcium phosphate takes place, transforming the insoluble $P_2O_5$ of the tri-calcium phosphate into a form which becomes soluble in the neutral ammonium citrate solutions used in the fertilizer industries for determining the soil availability of this acid, and therefore said $P_2O_5$ becomes of considerable increased value as a fertilizer material. Numerous patents have been granted prior to this invention for carrying out this operation, but I know of none that do not entail one or more serious objections when an attempt is made to operate it commercially. I believe that the real cause of the objections to these prior processes resides in the fact that the various operations required are so complicated that the reactions are not uniform, and therefore the availability of the phosphoric acid product cannot be depended upon. The result of a large series of experiments, carried out in a moderate sized rotary kiln, has cleared up the reactions involved quite extensively, and the following conclusions with regard to the conditions necessary to insure a commercially successful operating process have been arrived at. The cheapest available base for the process in question and which works satisfactorily is salt cake, or sodium sulfate. This need not be the neutral salt, but one can use any chemical equivalent preparation *e. g.* niter cake, or bisulfate, formulating the equivalent amounts of soda. Attempts in the past to utilize this salt have failed largely because the exact nature of the reactions involved have not been thoroughly understood, and the processes thereby complicated to such an extent that the commercial apparatus either had an extremely small capacity for its size and investment, or else turned out a product which was not uniform with regard to the quantity of available phosphate in the finished product.

The fertilizer industry is a very peculiar one in its requirements in that the question of uniformity of product plays a very important part in the determination of the acceptability of a new material by the trade, because of the conditions existing among the very numerous small mixers who cannot afford the service of a chemist to control the composition of their finished mixed fertilizers; but these conditions are fully complied with in the present invention as will appear below.

When a phosphate rock and sodium sulfate are mixed in such proportions that there is a large quantity of sulfate present say 30% or over of sulfate, and the mass charged into a rotary kiln, or similar calcining furnace, one normally obtains either a clinkered or a fused mass, which shows only a small fraction of the total $P_2O_5$ content of the mixture in the available form. On the other hand, however, if this mixture is made by grinding wet in a suitable grinding apparatus, such as a tube mill, and charged into a very hot rotary kiln, or similar device, so that it dries very quickly, either in very small grains or in very thin plates, and is by any suitable means so treated that the plates or grains maintain their individuality, and such mass is then passed through a rotary kiln where it is heated to an extremely high temperature approaching 1400° C., it merely sinters together to a spongy mass and shows a very high phosphoric acid availability. But unfortunately the last process just stated is limited by a very small output for very large scale operations, and it entails a very great deal of manual labor to insure the individuality of the very small particles, in their passage through the kiln. Stated in other words, experience with this process, shows that while it yields in the majority of cases a very acceptable product, from the chemical standpoint the output of the rotary kiln is extremely small, being less than 5% of the capacity of the same kiln when operating on the manufacture of Portland cement, for example, although thermal requirements of the process are far less exacting than those of the usual wet cement operation.

The difference between the behavior of this same material in the two cases cited above, I believe to be as follows: In the first case, the sodium sulfate seems to fuse as such while losing but a small fraction of its $SO_4$ radical, and in such state the soda shows little tendency to enter into combination with the tri-calcium phosphate; the only part of the phosphoric acid that is made available by this treatment is, therefore, that corresponding to the small amount of sulfate accidentally decomposed, in which case the soda enters into the combination. In the second case, on the other hand, the exposure of the thin layer or small particle of material to the action of the flame in the kiln, seems to give ample opportunity for decomposition of the sulfate as it is heated to redness. This fact has been proved by analysis of the kiln gases, as well as by their appearance. The soda is, therefore in the second case free to enter into combination. But unfortunately this second process does not work well with a kiln operating under normal load, because there seems to be some hindrance in the dissipation of the sulfate radical, wherever more than very thin layers are passing through the kiln.

As a result of a long series of experiments, similar to the above, it has been definitely proved that in every case in which the sulfate radical has been eliminated before reaching a temperature of 1000° C. or above, good yields, with a normal load such as one would find in the cement industry, can be obtained from the kiln. A simple way to eliminate the $SO_4$ radical is by operating in the following manner, which introduces no more complications than are encountered in the cement industry. Phosphate rock and sodium sulfate are ground together in a suitable grinding apparatus, and I prefer to get the mixture as fine as possible. A dry tube mill is quite satisfactory, grinding to say 85% to 90% through a 200 mesh screen. This practice is common in the cement industry. This mixture is formulated to contain with the normal phosphate rock running less than 10% $SiO_2$, as follows: 100 parts of rock and 20 parts of dry sodium sulfate, or its equivalent in niter cake. To this mixture, either in the grinding mill or in the separate device is added 15 parts of bituminous coal, preferably a gas coal containing from 60 to 70% fixed carbon. If one desires, this mixture can be made in the grinding mill and the whole mass of rock, soda and coal ground up to pass the desired mesh screen at one operation. The sodium sulfate above referred to, can of course, be replaced by sodium acid sulfate, potassium sulfate, or potassium acid sulfate. It is also possible to replace the said sodium sulfate by either potassium carbonate or sodium carbonate, or by the corresponding sodium bi-carbonates. In any of these substitutions one can readily determine the quantity required by calculating an equivalent in base to the 15% sodium sulfate previously referred to. By the terms suitable alkali metal salt, and suitable sodium salt found in the claims, I mean to include one or more of the above mentioned compounds, to the exclusion of all others. This dry mixture may be fed into a rotary cement kiln, lined throughout its cooler part with ordinary fire clay brick, and throughout its combustion zone with magnesia brick or alumina brick. This kiln in this form is the same as was formerly used in the cement industry and is still to be found in certain mills. Any suitable flame may be used in this kiln, and a full white heat in the combustion zone should be maintained with an oxidizing atmosphere as far as possible throughout the rest of the kiln. I charge this mixture of ground phosphate rock, sodium sulfate and coal into the upper end of the kiln; and as it heats up the coal ignites and reduces the sodium sulfate added to sodium sulfid. As this reduced material passes down through the kiln the sulfid readily oxidizes and nearly all of its sulfur content leaves the kiln in the form of sulfur dioxid. If the kiln is sufficiently long, and the feed properly proportioned, one will find that by the time this mixture reaches the burning zone there is only a trace of sulfur left in the mixture. In the burning zone, the sodium begins to react with the constituents of the rock, and, as the temperature should be carried at a white heat, or above, a sintering or clinkering takes place, just as in the cement kiln, and a brownish product is discharged from the kiln, which, if finely ground, shows upward of 90% of the total $P_2O_5$ present in a citrate soluble form.

It is important to the success of the process that the temperature of the kiln be kept at such point that an incipient fusion actually does take place, or the kiln charge will not be transformed into an available phosphate form. The mere passage of the material through the kiln without this clinkering is not sufficient to render the $P_2O_5$ available.

It will now be clear that in the process above disclosed by the addition of a comparatively small amount of sodium sulfate and coal to phosphate rock, and its subsequent clinkering in a rotary kiln, one can obtain a most desirable fertilizer material, containing a high percentage of available phosphoric acid. For instance, the average of a long series of runs made according to the above process, yielded from a Florida rock containing 30.6% $P_2O_5$ a finished product containing—

Total $P_2O_5$ ———————— 29.8%
Available $P_2O_5$ ———————— 26.7%
Insoluble $P_2O_5$ ———————— 3.1%

On crowding the kiln to the very limit of capacity that could be put through it, and at the same time leave sufficient space for the passage of the gases without actually carrying the larger part of the charge out of the kiln, there was obtained a product containing—

Total $P_2O_5$ ———————— 29.9%
Available $P_2O_5$ ———————— 25.1%
Insoluble $P_2O_5$ ———————— 4.8%

These results show that excessive over feeding of the kiln does not have an extremely serious effect upon the availability of the finished product. In case, however, the temperature of the kiln drops down below the point necessary for clinkering, the availability drops off very considerably, as shown by the following example, in which the temperature in the burning zone was only 1200° C.

Total $P_2O_5$ ———————— 29.3%
Available $P_2O_5$ ———————— 14.4%
Insoluble $P_2O_5$ ———————— 14.0%

It is, therefore, extremely important that one maintain temperatures of upward of 1400° C. in the combustion zone of the kiln.

It is obvious that those skilled in the art may vary the details of the invention without departing from the spirit thereof, and therefore I do not wish to be limited to the above disclosure except as may be required by the claims.

What I claim is:

1. The process of producing citrate soluble phosphoric acid from tri-calcium phosphate, which consists in mixing finely divided phosphate rock, a suitable alkali metal salt and carbon in suitable proportions; subjecting the mixture to a sufficient temperature to eliminate the acid radical from the said salt; then subjecting said mixture to a higher temperature sufficient to cause an incipient fusing or clinkering of the mixture, substantially as described.

2. The process of producing citrate soluble phosphoric acid from tri-calcium phosphate, which consists in mixing finely divided phosphate rock, sodium sulfate and carbon in suitable proportions; subjecting the mixture to a sufficient temperature and for a sufficient time to eliminate the sulfate radical from said sulfate; then subjecting said mixture to a higher temperature sufficient to cause an incipient fusing, or clinkering of the mixture, substantially as described.

3. The process of producing citrate soluble phosphoric acid from tri-calcium phosphate which consists in preparing a suitable mixture of said phosphate, a suitable sodium salt and carbon; subjecting said mixture to a suitable temperature to eliminate the acid radical from a substantial proportion of said salt; then subjecting said mixture to a higher temperature to cause an incipient fusing or clinkering of the mixture, substantially as described.

4. The process of producing citrate soluble phosphoric acid from tri-calcium phosphate which consists in preparing a suitable mixture of said phosphate, a suitable sodium salt and carbon; subjecting said mixture to a suitable temperature to eliminate the acid radical from a substantial proportion of said salt; subjecting said mixture to a higher temperature to cause an incipient fusing or clinkering; then discharging said clinkered mixture from the furnace; and finely grinding the same, substantially as described.

In testimony whereof I affix my signature, in presence of two witnesses.

WALTER S. LANDIS.

Witnesses:
G. A. HENDRIE,
S. WARREN MAYS.